Figure 5:
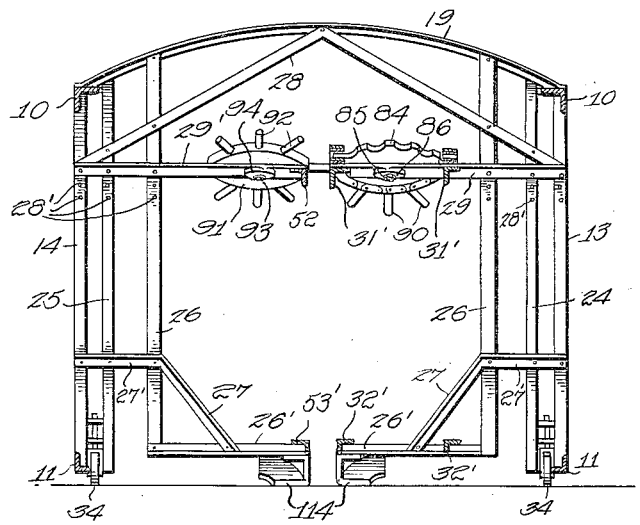

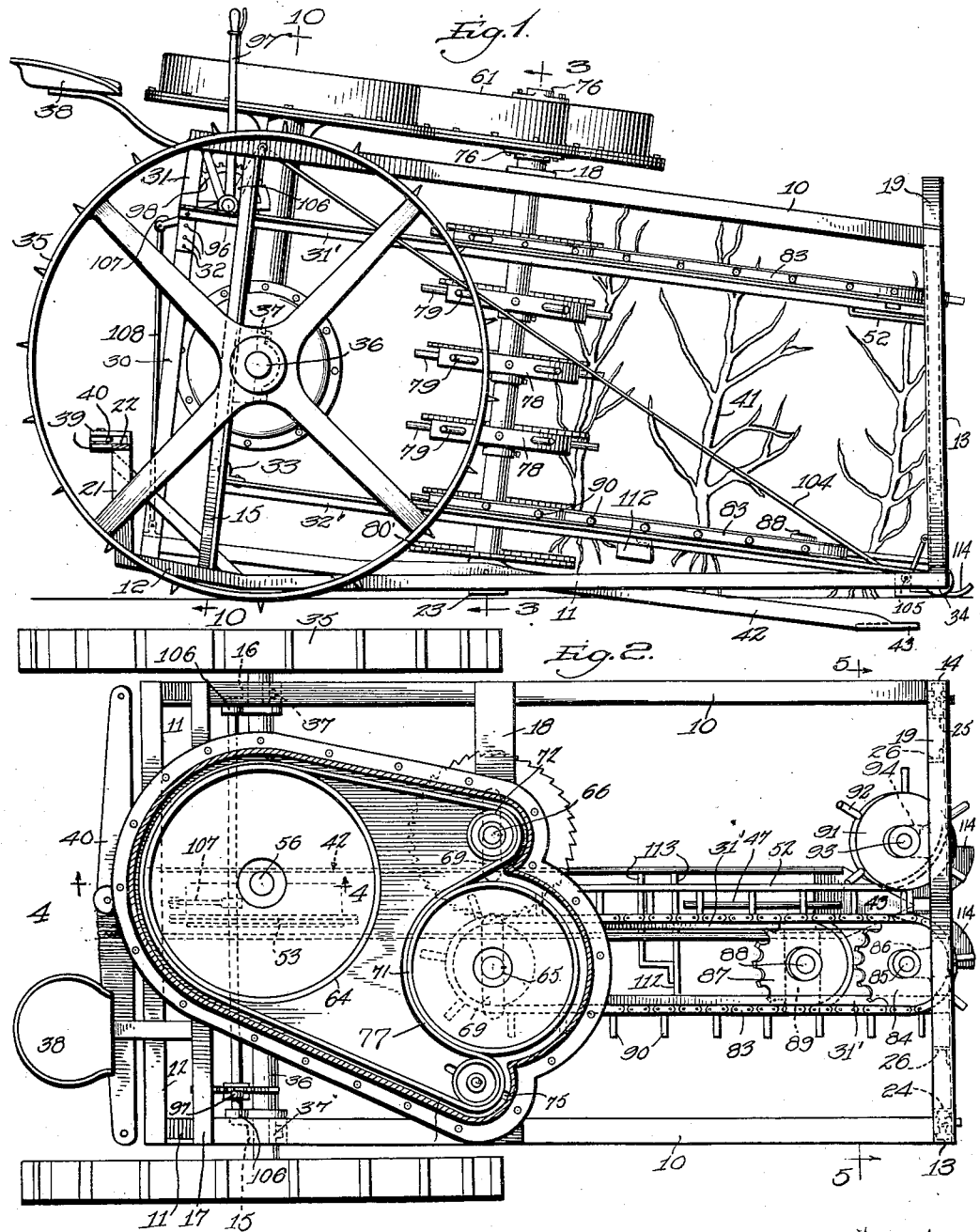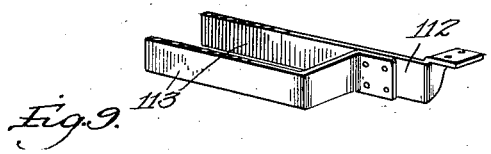

June 2, 1931.  P. W. SPELL  1,808,266
STALK CUTTER
Filed June 22, 1929  3 Sheets-Sheet 2
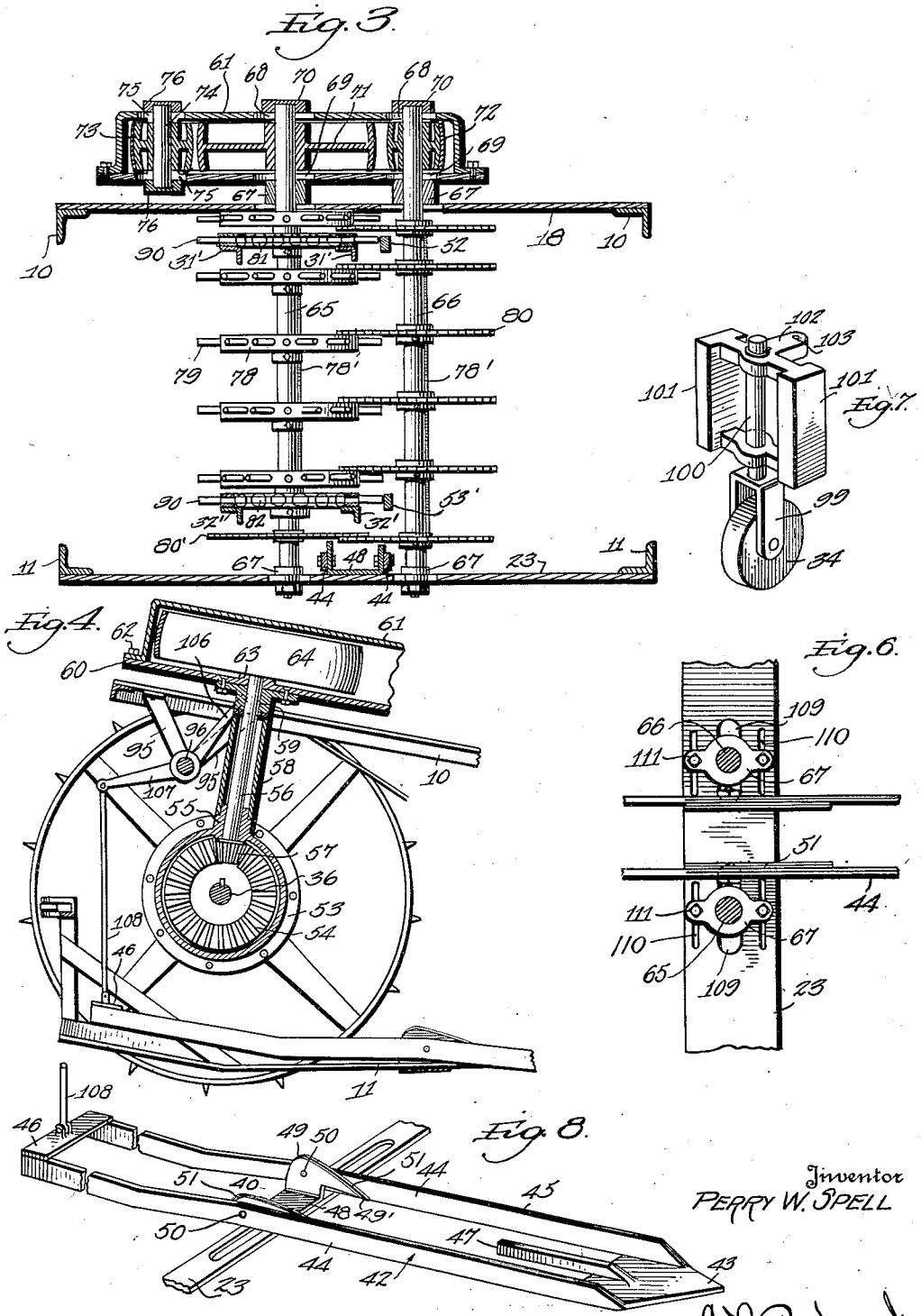
Inventor
PERRY W. SPELL
C. L. Parker Jr.
Attorney Inventor
PERRY W. SPELL By C. R. Parker Jr.
Attorney Patented June 2, 1931

1,808,266

UNITED STATES PATENT OFFICE

PERRY W. SPELL, OF ROSEBORO, NORTH CAROLINA

STALK CUTTER

Application filed June 22, 1929. Serial No. 372,893.

This invention relates to improvements in stalk cutters and particularly to improvements in the type of stalk cutter described and claimed in my United States Patent No. 1,713,197, granted May 14th, 1929.

An object of this invention is to provide a device of the character referred to adapted to uproot standing stalks such as those of corn, cotton, and similar plants, and to convey the uprooted stalks to cutting means carried by the device whereby the stalks may be cut into pieces small enough to be turned under the soil for fertilizing purposes, the conveying and cutting means of the device being normally angularly arranged with respect to the horizontal plane of the device.

Another object is to provide novel means for lifting the forward end of the frame of the device to more easily permit turning thereof.

A further object is to provide a pivoted rooter having sharp edges throughout the greater portion of its length to assist in cutting the roots from the stalks, novel means being provided for lifting the forward end of the rooter to more easily permit the device to be turned, additional means being provided to prevent side sway of the rooter.

A further object is to provide a relatively long tongue on the rooter to assist in preventing the stalks from falling through the device before they reach the cutting means.

A further object is to provide improved means for feeding the stalks to the cutting devices, the shafts carrying the feeders and cutters being arranged at an angle with respect to the horizontal plane of the frame and being adjustable to compensate for wear, the feeders and cutters also being adjustable vertically on the shafts.

A further object is to provide novel means for knocking lumps of dirt and the like from the roots of the stalks as they are being conveyed toward the cutters.

A further object is to provide novel means for permitting the conveying means to be adjusted to easily convey stalks of various lengths.

Other objects and advantages of the invention will become apparent during the course of the following description.

Figure 10:
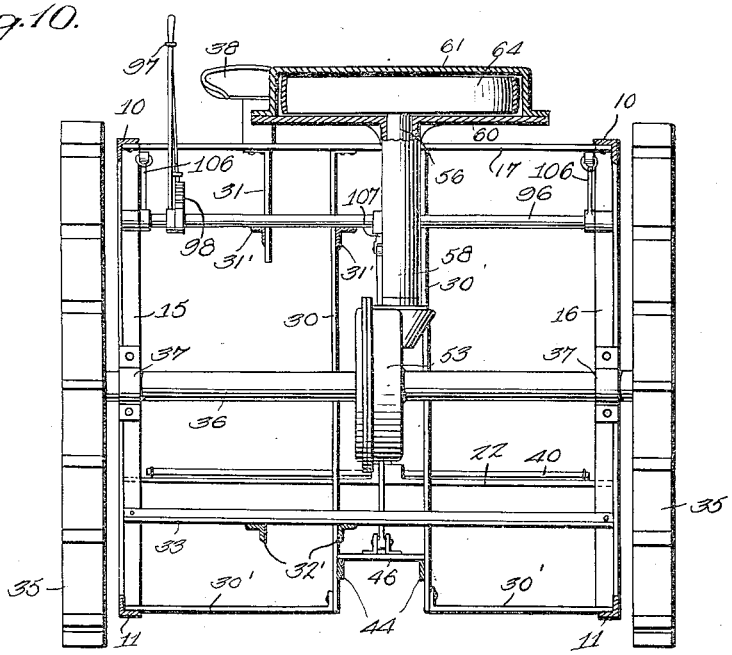

In the drawings I have shown one embodiment of the invention. In this showing:

Figure 1 is a side elevation,
Figure 2 is a plan view,
Figure 3 is a sectional view taken substantially on line 3—3 of Figure 1,
Figure 4 is a similar view taken substantially on line 4—4 of Figure 2, parts being broken away,
Figure 5 is a similar view taken substantially on line 5—5 of Figure 2,
Figure 6 is a fragmentary view of the base plate,
Figure 7 is a perspective view of one of the front wheels,
Figure 8 is a perspective view of the rooter.
Figure 9 is a perspective view of the double spring, and,
Figure 10 is a sectional view taken substantially on line 10—10 of Figure 1, parts being shown in elevation.

Referring to the drawings, the numeral 10 designates a pair of parallel upper side frame members inclined downwardly toward their front end, and the numeral 11 designates a pair of parallel lower side frame members disposed horizontally throughout the greater portion of their length, a short rearward portion of the members 11 being arranged parallel with the upright frame members 10, substantially as shown at 12. The front ends of the members 10 and 11 are connected by vertical channeled posts 13 and 14 and the members are connected inwardly of their rear extremities by angularly disposed posts 15 and 16. The frame members 10 are joined together by the transverse connecting bars or rails 17 and 18, and at their forward extremities the members 10 are connected by an arched member 19 substantially as shown in Figure 5. The member 19 is preferably formed of channel iron or other suitable material to permit a rigid construction between the frame members 10. The lower frame members 11 have a short upward extension 21 at the rear thereof and the tops of the extensions are connected by the transverse bar 22. The members 11 are also connected substantially centrally by the transverse member 23. At the front end of the device arranged parallel with the posts 13 and 14 and inwardly thereof are channeled posts 24 and 25 which are connected at their upper ends to the member 19 (see Figure 5). Inwardly of the posts 24 and 25 are posts 26 arranged parallel thereto and connected at their upper extremities to the member 19. A pair of inwardly extending arms 26' have one end secured to the lower extremities of the posts 26 and braces 27 are arranged between the members 26 and 26'. A pair of short cross members 27' connect the uprights 13, 24, 26 and 14, 25, 26 respectively, and adjacent the top an angularly arranged cross member 28 is connected to the uprights and to the member 19. Below the ends of the member 28, the uprights are provided with a series of openings 28' and a pair of arms 29 and 29' are adjustably secured to the uprights by utilizing selected openings 28' as will be understood, for a purpose to be described. Substantially centrally thereof, the cross member 17 has a pair of spaced depending members 30 connected thereto, and the lower ends of the members 30 are connected to short cross members 30' which are connected to the lower rails 11 (see Figure 10). Spaced from one of the members 30 a short depending arm 31 is secured at its upper end to the member 17.

Inclined longitudinal members 31' have their rear ends adjustably secured to one of the members 30 and the arm 31 respectively and the front ends of the members 31' are secured to the arm 29. As shown in Figure 1 one of the members 30 and the arm 31 are provided with a plurality of openings 32 whereby the ends of the longitudinal members 31' may be secured in selected positions. Beneath the members 31' additional longitudinal members 32' are arranged parallel therewith, being connected at their front ends to one of the arms 26'. The rear ends of the members 32' are connected to a cross member 33 arranged between the rear posts 15 and 16.

The elements described constitute the body portion of the apparatus which may be supported at its forward end for movement over the ground by wheels or casters 34. At its rear end the body is supported by relatively large cleated wheels 35 mounted upon a transverse axle 36 journaled in bearings 37 carried by the rear upright members 15 and 16. If desired the apparatus may be provided with a driver's seat 38, and may be propelled over the ground in any desired manner. As shown, (see Figure 1) the member 22 is provided with a pair of rearwardly extending ears 39 and a singletree 40 is pivoted between these ears. Suitable connections may be made to the ends of the singletree whereby the apparatus may be pulled by animals or the like.

As the device travels through a field, it is adapted to lift stalks 41 from the ground by means of a pivoted lifting member or rooter 42 having a pointed forward end 43. The rooter comprises a pair of parallel side members 44 provided with knife-like edges 45 throughout the greater portion of its length. The members 44 extend from the pointed forward end to a plate 46 connecting them together at their rear extremities. After passing their pivot point the members 44 incline slightly downwardly and then upwardly toward the plate 46. The rear extremity of the rooter is operable between the depending members 30 to prevent lateral movement or side sway of the rooter as will be more fully explained. The forward portion of the rooter is provided with an integral longitudinally extending tongue 47 for a purpose to be described. As shown in Figure 8 the transverse member 23 has a plate 48 suitably secured thereto, provided with upstanding sides 49 to which the members 44 are pivotally connected by means of pivot pins 50 or the like. The upper edges of the members 49 are also provided with knife-like edges 51. The sides 49 extend forwardly a short distance and are pointed as shown at 49'. Means to be described are provided for pivoting the rooter when desired.

Stalks lifted by the member 42 are adapted to move rearwardly through the apparatus and are guided in their movement by upper and lower parallel guides 52 and 53 having their forward ends curved outwardly. These guides will be suitably secured to the body of the apparatus as will be apparent.

The axle 36 is provided intermediate its ends with a gear housing 53, a bevel gear 54 being arranged in this housing and being secured to the axle 36 to rotate therewith. The upper portion of the housing is provided with a bearing 55 in which is journaled a shaft 56 having a bevel pinion 57 at its lower end meshing with the gear 54. A supporting sleeve 58 surrounds the shaft 56 and is secured at its lower end to the bearing 55. The upper end of the sleeve supports a bearing 59 to which is secured a plate 60 forming a part of a relatively large housing 61. The elements of this housing may be secured together by bolts 62. The lower portion of the housing is provided with a bearing 63 rotatably receiving the upper end of the shaft 56, and this shaft is provided within the housing with a relatively large pulley 64.

A pair of shafts 65 and 66 are journaled in suitable bearings 67 adjustably carried by the cross members 18 and 23 (see Figure 6). These shafts 65 and 66 extend through openings 68 and 69 in the upper and lower wall of the housing 61 and the ends of the shafts are journaled in bearings 70 suitably secured to the housing.

Within the housing 61 the shaft 65 rotatably carries a pulley 71 of slightly less diameter than the pulley 64 and the shaft 66 rotatably carries a relatively small pulley 72. Adjacent the pulley 71 and on the opposite side thereof from the pulley 70, a small idle pulley 73 is mounted in the housing 61. The pulley 73 is carried on a stub shaft 74 which extends through openings 75 in the housing 61 and is journaled in bearings 76. A pulley belt 77 or the like drives the pulleys 64, 71, 72 and 73 substantially as shown in Figure 2.

At spaced intervals the shaft 65 is provided with discs 78 having radial pins 79 projecting therefrom, and at spaced intervals above each disc 78, the shaft 66 is provided with circular saw blades 80. The shaft 65 preferably carries one saw 80' adjacent its lower end arranged slightly above the lowermost saw 80 carried on the shaft 66. The shaft 65 also is provided with upper and lower sprockets 81 and 82 about which endless chains 83 pass. The discs 78, saw blades 80 and upper sprocket 81 may be mounted on the shafts 65 and 66 in any suitable manner to permit longitudinal adjustment thereof on the shafts. As shown, the numeral 78' refers to a splined construction whereby longitudinal adjustment of the members referred to may be accomplished. The lowermost saw blade 80, the saw blade 80' and the lower sprocket 82 need not be adjustable and accordingly these members are preferably rigidly fixed to their respective shafts. The upper chain 83 extends to a point near the forward end of the frame, and passes around a sprocket 84 mounted upon a shaft 85 journaled in bearings 86 carried by the extended portion of the adjustable arm 29. The lower chain 83 passes around a forward sprocket 87 mounted upon a shaft 88 journaled in bearings 89 carried by the lower longitudinal members 32'. At spaced intervals the chains are provided with projections 90. An idle disc 91 having radial pins 92 projecting therefrom is rotatably mounted on a shaft 93 journaled in bearings 94 carried by the extended portion of the adjustable arm 29'. The disc 91 and sprocket 84 are arranged in substantially the same plane whereby the projections 90 on the chains will engage the projections 92 of the disc to rotate the latter.

Means are provided for lifting the forward end of the frame and rooter to permit the apparatus to be more easily turned when it reaches the end of a row of stalks. As shown in Figure 4 the upper frame members 10 have depending bracket arms 95 secured thereto and a rock shaft 96 is journaled in the lower portion of the bracket arms. A handle 97 is rigidly secured to the shaft 96 adjacent the driver's seat 38 and is adapted to rock this shaft upon movement by the driver of the apparatus. A gear quadrant 98 may be arranged adjacent the handle 97 whereby the latter may be held in any desired position, as will be understood.

Referring to Figure 7 the caster 34 is rotatably carried between arms 99 from which a stem 100 projects upwardly. Substantially T-shaped members 101 are carried by the stem 100 on opposite sides thereof and an integral projecting portion 102 is arranged adjacent the top of the stem. The construction just described fits within the channels in the members 13, 24 and 14, 25 whereby the T-shaped members will be movable within the channels. The projections 102 are each provided with an opening 103 to which is secured one end of a cable 104, the latter passing beneath a pulley 105 carried by the frame and having its opposite end secured to the free end of an angularly arranged arm 106, the opposite end of which is rigidly secured to the shaft 96, adjacent the end thereof. Each side of the frame has the cable 104 extending therealong whereby the whole front of the frame may be lifted, as will be understood. Substantially centrally of the shaft 96 an arm 107 is secured thereto and the free end of this arm is connected to one end of a rod 108 which is connected at its opposite end to the plate 46 of the rooter 42. It will be apparent that movement of the handle 97 will cause the rooter to pivot about its pivot point to be raised or lowered as desired. Likewise movement of the handle 97 will cause the forward end of the frame to slide upwardly along the T-shaped members 101 whereby this end of the frame may be lifted when the apparatus is turned. As the rear end of the rooter operates between the members 30 it will be apparent that accidental lateral movement or side sway of the rooter will be prevented.

The lower cross member 23 (see Figure 6) is provided with relatively large elongated openings 109 and on each side thereof narrow openings 110 are arranged. Bolts 111 extend through the openings 110 and the bearings 67 to permit the latter to be adjusted when the saws and feeder discs become worn. Similar openings are provided in the upper cross member 18 and the housing 61, as will be understood.

Referring to Figure 9 the numeral 112 indicates a flexible dirt remover as a whole which is secured to one of the lower frame members 32' a slight distance forwardly of the saw blades of the device. The dirt remover comprises a pair of spaced spring steel arms 113 arranged parallel for a purpose to be described. Adjacent the bottom the front end of the body is provided substantially centrally thereof with spaced skids or guides 114 which are preferably carried by the arms 26'.

The operation of the device is as follows:

The body of the apparatus will be supported by the forward and rear wheels and may be propelled over the ground in any suitable manner. The device is moved over the ground with a row of stalks in alignment with the space between the guides 114 and between the sprocket 84 and disc 91 whereby the stalks will move thereinto as the vehicle progresses. The roots of the stalks will be lifted from the ground by the member 42 so that the complete plant will be elevated as shown in Figure 1. The conveyor chains and the saws and feeding discs are arranged angularly with respect to the horizontal plane of the apparatus whereby there will be less tendency for the stalks to fall through the device after they are uprooted. The tongue 47 of the rooter is engaged by the roots of the stalks and prevents the latter from falling through the device before they have been engaged by the projections on both the upper and lower conveyor chains. The stalks will be guided in their rearward movement by the guides 52 and 53 and will be held in substantially upright position by the projections 90 of the conveyor chains. These conveyor chains are adapted to travel at equal speeds to hold the stalks in upright position. The rearward linear speed of the inner runs of the chains is to be equal to the linear speed of the apparatus as it passes over the ground and accordingly there will be no tendency for the stalks to be thrown out of their upright positions.

The movement of the apparatus over the ground obviously rotates the axle 36 which drives the shaft 56 through the bevel gear 54 and pinion 57. The rotation of the shaft 56 drives the large pulley 64 and the pulleys 71, 72 and 73 will be driven from the latter by means of the belt 77. The pulley 72 will be driven at a relatively high speed to rotate the saw blades 80 while the feeding discs 78 will be driven at a much slower rate of speed due to the size of the pulley 71 in comparison with the pulley 72. As the stalks move rearwardly they will be successively engaged by the projections 79 of the discs 78, one of these discs being arranged adjacent each of the saw blades 80 to feed the stalks thereagainst. The rapid rotation of the saw blades efficiently cuts the stalks into relatively short pieces which fall to the ground and may be turned under the soil for fertilizing purposes. Any stalks which have a tendency to clog near the entrance of the apparatus will be moved thereinto by either the projections 90 on the upper chain or the projections 92 on the idle disc 91, as will be apparent.

The roots of the stalks often have large lumps of dirt adhering thereto and it is desired to remove this dirt before the saws engage the same. When the roots engage the spring members 113 successively, practically all of the dirt is knocked from the roots. Some of the roots are relatively long and have a tendency to drag over the ground after the stalks are lifted. When these long roots come into engagement with the sharp knife-like edges of the rooter and the sides of the member 48 they are severed and thus prevented from dragging the stalks.

As previously stated the forward end of the apparatus may be lifted by rocking the shaft 96 and likewise the front end of the rooter may also be lifted to permit the apparatus to more easily be turned at the end of a row of stalks.

The provision of the adjustable shafts 65 and 66 permits these members to be moved closer together when desired. Also the opening 75 in the housing 61 permits the idle pulley shaft 74 to be adjusted when the belt becomes loose, as will be apparent.

It will be noted that the transverse members 31' and 32' are arranged directly beneath and parallel with the chains 83 so there will be no tendency for the latter to sag and possibly jump off their sprockets. It will also be apparent that the upper sprockets may be easily lowered to permit relatively short stalks to be picked up by the apparatus. The arms 29 and 29' are easily adjustable to permit the front upper sprocket 84 and the disc 91 to be lowered or raised when desired. Similarly the splined connection of the sprocket 81 permits longitudinal adjustment on its shaft. The front ends of the longitudinal members 31' are secured to the arm 29 and accordingly will be raised or lowered with the arm. The rear ends of the members 31' may be adjusted as previously described.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A stalk cutter comprising a frame, supporting wheels carried by said frame, pivoted stalk lifting means carried by said frame, stalk cutting means also carried by said frame, means for conveying stalks from said lifting means to said cutting means, and means operable from a common control for simultaneously raising the forward end of said frame and said lifting means.

2. A stalk cutter comprising a frame, supporting wheels carried by said frame, pivoted stalk lifting means carried by said frame, stalk cutting means also carried by said frame, means for conveying stalks from said lifting means to said cutting means, means for raising the forward end of said frame, and means for raising said lifting means, said last named and said next to last named means being operable from a common control.

3. In a stalk cutter comprising a frame, supporting wheels arranged adjacent the front and rear of said frame, stalk lifting means pivotally carried by said frame, and means operable from a common control for simultaneously raising and lowering said stalk lifting means and the forward end of said frame.

4. In a stalk cutter comprising a frame, supporting wheels arranged adjacent the front and rear of said frame, stalk lifting means pivotally carried by said frame, means for raising and lowering the forward end of said frame, and means for raising and lowering said lifting means, said last named and said next to last named means being operable from a common control.

5. A stalk cutter comprising a frame, supporting wheels carried by said frame, stalk lifting means carried by said frame, stalk cutting means carried by said frame, means for conveying stalks from said lifting to said cutting means, and means carried by said frame for knocking dirt from the roots of the stalks as they are being conveyed to the cutting means.

6. A device constructed in accordance with claim 5 wherein said last named means comprises a pair of spring arms adapted to successively engage the roots of the stalk.

7. In a stalk cutter comprising a frame, supporting wheels arranged adjacent the front and rear thereof, and a stalk lifter pivotally carried by said frame, said lifter having upright sides provided with relatively sharp edges.

In testimony whereof I affix my signature.

PERRY W. SPELL.